US008768913B2

(12) United States Patent
Copperman

(10) Patent No.: US 8,768,913 B2
(45) Date of Patent: Jul. 1, 2014

(54) MULTI-SOURCE SEARCHING IN A DATA DRIVEN APPLICATION

(75) Inventor: Max Copperman, Sunnyvale, CA (US)

(73) Assignee: Kana Software, Inc., Sunnyvale, CA (US)

( * ) Notice: Subject to any disclaimer, the term of this patent is extended or adjusted under 35 U.S.C. 154(b) by 0 days.

(21) Appl. No.: 13/250,152

(22) Filed: Sep. 30, 2011

(65) Prior Publication Data

US 2012/0078877 A1 Mar. 29, 2012

Related U.S. Application Data

(63) Continuation-in-part of application No. 13/080,632, filed on Apr. 5, 2011, which is a continuation-in-part of application No. 12/603,524, filed on Oct. 21, 2009.

(51) Int. Cl.
G06F 7/00 (2006.01)
G06F 17/30 (2006.01)

(52) U.S. Cl.
USPC .......................................................... 707/711

(58) Field of Classification Search
USPC .......................................................... 707/711
See application file for complete search history.

(56) References Cited

U.S. PATENT DOCUMENTS

| 6,081,774 | A  | * | 6/2000  | de Hita et al. ...................... 704/9 |
| 7,599,938 | B1 | * | 10/2009 | Harrison, Jr. ................. 705/7.29 |
| 7,640,266 | B2 | * | 12/2009 | Gestrelius et al. .................... 1/1 |
| 8,069,096 | B1 | * | 11/2011 | Ballaro et al. ............... 705/27.2 |
| 8,099,410 | B2 | * | 1/2012  | Day et al. ...................... 707/718 |
| 8,122,153 | B2 | * | 2/2012  | Sun ............................... 709/245 |
| 8,375,014 | B1 | * | 2/2013  | Brocato et al. ................ 707/705 |
| 2004/0002959 | A1 | * | 1/2004  | Alpert et al. ...................... 707/3 |
| 2004/0230571 | A1 | * | 11/2004 | Robertson .......................... 707/3 |
| 2005/0055363 | A1 | * | 3/2005  | Mather ........................ 707/102 |
| 2005/0210001 | A1 | * | 9/2005  | Lee .................................... 707/3 |
| 2006/0117073 | A1 | * | 6/2006  | Bosworth et al. ............. 707/201 |
| 2006/0235984 | A1 | * | 10/2006 | Kraus et al. ..................... 709/228 |
| 2006/0294063 | A1 | * | 12/2006 | Ali et al. ............................ 707/3 |
| 2008/0077570 | A1 | * | 3/2008  | Tang et al. ........................ 707/5 |
| 2008/0133488 | A1 | * | 6/2008  | Bandaru et al. ................... 707/3 |
| 2008/0235567 | A1 | * | 9/2008  | Raj et al. ....................... 715/226 |
| 2008/0250021 | A1 | * | 10/2008 | Boys et al. ......................... 707/9 |
| 2008/0275858 | A1 | * | 11/2008 | Day et al. .......................... 707/3 |
| 2008/0294619 | A1 | * | 11/2008 | Hamilton et al. .................. 707/5 |
| 2009/0019038 | A1 | * | 1/2009  | Millett .............................. 707/5 |
| 2009/0063953 | A1 | * | 3/2009  | Kraus et al. ..................... 715/234 |
| 2009/0106255 | A1 | * | 4/2009  | Lacapra et al. ................. 707/10 |
| 2009/0182708 | A1 | * | 7/2009  | Dettinger et al. ................. 707/2 |

(Continued)

Primary Examiner — Rehana Perveen
Assistant Examiner — Mark E Hershley
(74) Attorney, Agent, or Firm — Steven M. Greenberg; CRGO Law

(57) ABSTRACT

Embodiments of the invention provide a method, system and computer program product for a multi-source search. In an embodiment, a method for multi-source searching for a data driven application includes defining a form for a data driven application that includes user interface controls each corresponding to respectively to different fields in different data sources. The method also includes generating a search index for the form incorporating the different fields, coupling the form with a search user interface that includes a search control configured to accept at least one query term and associating the search control with a selection of the different fields. Thereafter, during execution of the data driven application, a search engine query can be directed for the selection of the different fields in the search index and not the different data sources according to the at least one query term provided in the search user interface.

19 Claims, 2 Drawing Sheets

(56) References Cited

U.S. PATENT DOCUMENTS

| | | | |
|---|---|---|---|
| 2009/0204610 A1* | 8/2009 | Hellstrom et al. | 707/5 |
| 2009/0234813 A1* | 9/2009 | Gutlapalli et al. | 707/3 |
| 2009/0234970 A1* | 9/2009 | Sun | 709/245 |
| 2009/0319544 A1* | 12/2009 | Griffin et al. | 707/100 |
| 2010/0076980 A1* | 3/2010 | Dumitrean | 707/741 |

* cited by examiner

MULTI-SOURCE SEARCHING IN A DATA DRIVEN APPLICATION

CROSS-REFERENCE TO RELATED APPLICATIONS

This patent application claims the benefit under 35 U.S.C. §120 as a continuation-in-part of presently pending U.S. patent application Ser. No. 13/080,632, entitled FORM PROCESSING IN A USER INTERFACE WORKFLOW COMPOSITION TOOL, filed on Apr. 5, 2011, which is a continuation-in-part of presently pending U.S. patent application Ser. No. 12/603,524, entitled USER INTERFACE WORKFLOW COMPOSITION METHOD, SYSTEM AND COMPUTER PROGRAM PRODUCT, filed on Oct. 21, 2009, the entire teachings of both patent applications of which are incorporated herein by reference.

BACKGROUND OF THE INVENTION

1. Field of the Invention

The present invention relates to the field of database query operations and more particularly to search multiple fields of multiple different data sources through a query interface.

2. Description of the Related Art

A database query is an inquiry into a database used to extract data from the database in a readable format according to the user's request. A database query generally requires a connection into a database, an interface through which one or more query terms can be specified and a query engine configured to process the query terms according to one or more conditions—generally expressed by boolean operators or mathematical operators or both. The interface can be nothing more than an application programming interface specifying a prototype to which a database query should conform. Alternatively, the interface can be a graphical user interface into which an end user can specify search terms and operators—in more advanced forms—using a drag and drop interface for either or both of bounded query terms and operators.

A database often includes multiple different tables. As such, to query multiple different tables, first the tables must be treated as one so that a query can be performed against the different tables as if the different tables were a single, unitary table. In structured query language (SQL), the JOIN statement is used to achieve the treatment of different tables as one when conducting a query operation. However, joining two tables together can be computationally expensive and effective only when access and control to both tables can be achieved. For external data sources, no such access and control can be provided thereby impeding the joining of an internal data source with an external data source.

Historically, data driven applications relied upon data disposed in locally disposed data stores. With the advent of distributed computing and advanced database management technologies, however, modern data driven applications access data in both local and remote data stores. Even more advanced business object centric applications access data both in local data stores and also remotely over the Internet through intermediate business objects accessing external data stores—oftentimes not within the control of the application itself.

BRIEF SUMMARY OF THE INVENTION

Embodiments of the present invention address deficiencies of the art in respect to database query operations and provide a novel and non-obvious method, system and computer program product for a multi-source search designer enabled to assemble a search widget configured to search multiple different data sources including external data sources. In an embodiment of the invention, a method for multi-source searching for a data driven application is provided. The method includes defining a form for a data driven application that includes user interface controls each corresponding to respectively to different fields in different data sources. The method also includes generating a search index for the form incorporating the different fields, coupling the form with a search user interface that includes a search control configured to accept at least one query term and associating the search control with a selection of the different fields. Thereafter, during execution of the data driven application, a search engine query can be directed for the selection of the different fields in the search index and not the different data sources according to the at least one query term provided in the search user interface.

In another embodiment of the invention, a multi-source search data processing system can be configured for multi-source searching for a data driven application. The system can include a host computer including memory and at least one processor and an application server executing in the host computer. A composition tool can be hosted by the application server and can define a form for a data driven application. The form can include different user interface controls each corresponding respectively to different fields in different data sources. The composition tool also can generate a search index for the form incorporating the different fields, and can couple the form with a search user interface that includes a search control configured to accept at least one query term. Finally, the composition tool can associate the search control with a selection of the different fields. The system yet further can include a search service that during execution of the data driven application in the application server, can direct a search engine query of the selection of the different fields in the search index and not the different data sources according to the at least one query term provided in the search user interface.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for a multi-source search designer for a data driven application. In accordance with an embodiment of the invention, a search index can be generated from different data in different fields of different data sources over a computer communications network for a data driven application. At least one of the data sources can be a data source external to and unrelated to the data driven application. A search field can be disposed in a search user interface to a search engine for the data driven application and the search field can be configured to accept text input specifying different query terms. The search field can be additionally configured to apply a search of the query terms against different fields of the search index generated from correspondingly different fields of the different data sources, including the at least one external data source. In this way, the multiple different data sources can be incorporated in a single query without requiring the a priori joining of the different data sources.

Figure 1:
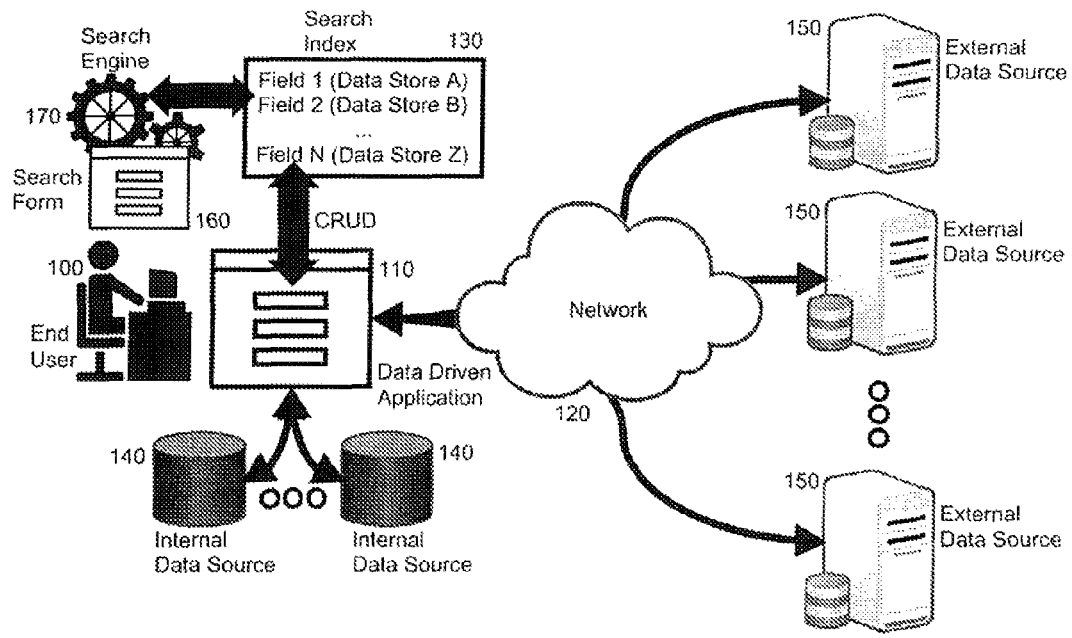
FIG. 1 is a pictorial illustration of a process for a multi-source searching for a data driven application.

In further illustration, FIG. 1 pictorially shows a process for a multi-source searching for a data driven application. As shown in FIG. 1, an end user 100 can direct data operations (create, read, update and delete) in a data driven application 110 against data sourced from different data sources 140, 150 including internal data sources 140 incorporated as part of the data driven application 110, and external data sources 150 over a computer communications network 120 such as the Internet, that are both separate from and not part of the data driven application 110. As the end user 100 directs data operations in the data driven application 110, the data can be written to a search index 130 internal to and included as part of the data driven application 110.

Thereafter, a search form 160 can be provided as part of the data driven application 110 through which different query terms searching different fields of the different data sources 140, 150. As searches are commanded in the search form 160, query terms provided in the search form can be used by a search engine 170 to search not the different fields of the different data sources 140, 150, but corresponding fields in the search index 130. In this way, the different data sources 140, 150 can be subject to a search engine query without first requiring a join operation joining together the data sources 140, 150—particularly where a join is not possible for an external data source 150.

Figure 2:
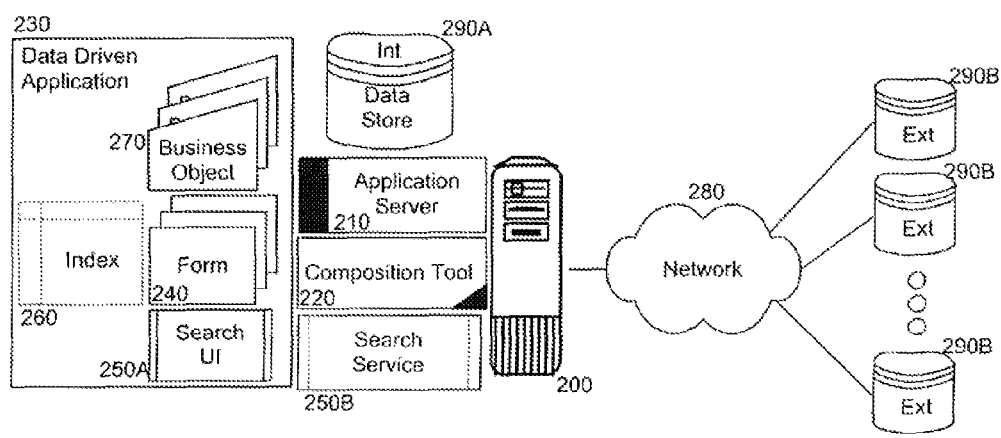
FIG. 2 is a schematic illustration of multi-source search data processing system configured for multi-source searching for a data driven application; and, FIG. 3 is a flow chart illustrating a process for multi-source searching for a data driven application.

The process described in connection with FIG. 1 can be implemented within a multi-source search data processing system. In further illustration, FIG. 2 schematically shows a multi-source search data processing system configured for multisource searching for a data driven application. The system can include a host computer 200 with at least one processor and memory. The host computer 200 can support the operation of an application server 210 hosting the execution of a composition tool 220 configured to compose a data driven application 230 such as an end user workflow. The data driven application 230 can include multiple different screens or forms 240 defined by the composition tool 220. The forms 240 can reference different fields of different data sources 290A, 290B, including internal data sources 290A and external data sources 290B. Optionally, the external data sources 290B can be rendered accessible through the instantiation of one or more different business objects 270.

Importantly, as the data model for the data driven application 230 is defined during composition of the data driven application 230 by the composition tool 220, a search index 260 can be created to include the different fields referenced in the forms 240 of the data driven application 230. Further, during execution of the data driven application 230, data operations for the different fields referenced in the forms 240 can be reflected in the search index 260. In particular, the data operations can include any of create, read, update and delete operations. Subsequently, the data operations can be reflected in respective fields of corresponding ones of the data sources 290A, 290B, for example, during a batch mode updating of the data sources 290A, 290B.

Of note, a search user interface 250A can be defined by the composition tool 220 as part of the data driven application 230 and can include one or more text controls into which one or more different query terms can be specified by an end user. The text controls can be linked to one or more fields of the search index 260 corresponding to fields in the data sources 290A, 290B. As such, a search service 250B executing in the memory of the host computer 200 can process the query terms in searching the data sources 290A, 290B by searching the search index 260. In this way, the different data sources 290A, 290B can be subject to a search engine query by the search service 250B without first requiring a join operation joining together the data sources 290A, 290B—particularly where a join is not possible for an external data source 290B.

Figure 3:
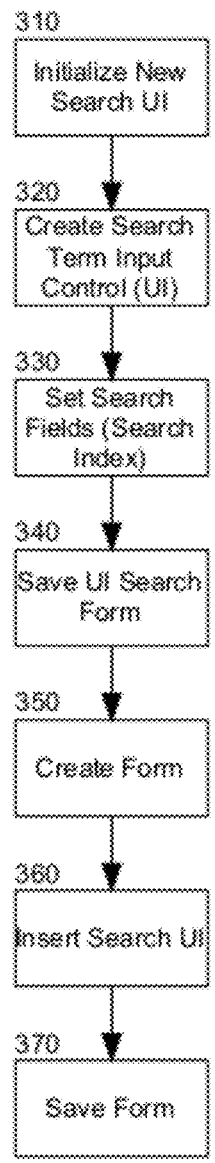

In even yet further illustration, FIG. 3 is a flow chart illustrating a process for multi-source searching for a data driven application. Beginning in block 310, a new search user interface can be composed in a composition tool for composing data driven applications. In block 320, a search term input control can be placed in the search user interface into which textual query terms can be provided. In block 330, the input control can be associated with one or more different search fields of a search index, each of the search fields corresponding to a field in a data source and at least one of the search fields corresponding to a field in an external data source separate from the data driven application and optionally accessed through an intermediate business object. Thereafter, in block 330 the search user interface can be saved as part of the data driven application.

In block 350, a form for the data driven application can be created by the composition tool and can include different form controls through which data operations can be directed against data in different fields of the different data sources. In block 360, the saved search user interface can be coupled to the form so as to provide a search capability for one or more of the form controls. Finally, in block 370, the form can be saved as part of the data driven application.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. With specific reference to a computer readable storage medium, it is to be understood that a computer readable storage medium excludes transitory media such as transitory signals and other propagation media.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A method for multi-source searching for a data driven application, the method comprising:

defining a form for a data driven application, the form comprising a plurality of user interface controls corresponding, respectively, to different fields in different data sources;

generating a single search index for the form, the single search index including the different fields referenced in the form and also at least one data operation for the different fields referenced in the form;

coupling the form with a search user interface comprising a search control configured to accept at least one query term, the search control comprising a text control configured to link to one or more of the different fields of the single search index; and, directing during execution of the data driven application a search engine query of the selection of the different fields in the single search index and not the different data sources according to the at least one query term provided in the search user interface without first requiring a join operation joining the different data sources.

2. The method of claim 1, wherein the data driven application is a user interface workflow.

3. The method of claim 1, wherein at least one of the different data sources is separate and independent of the data driven application.

4. The method of claim 1, wherein at least one of the different data sources is accessible through an intermediate business object.

5. The method of claim 1, further comprising updating data in the different fields of the single search index responsive to a data access operation directed in the form during the execution of the data driven application.

6. The method of claim 5, further comprising updating corresponding data fields in the data sources subsequent to updating the single search index responsive to a data access operation directed in the form during the execution of the data driven application.

7. A multi-source search data processing system configured for multi-source searching for a data driven application, the system comprising:

a host computer comprising memory and at least one processor;

an application server executing in the host computer;

a composition tool hosted by the application server, the composition tool defining a form for a data driven application, the form comprising a plurality of user interface controls corresponding to respectively to different fields in different data sources, generating a single search index for the form, the single search index including the different fields referenced in the form and also at least one data operation for the different fields referenced in the form, and coupling the form with a search user interface comprising a search control configured to accept at least one query term, the search control comprising a text control configured to link to one or more of the different fields of the single search index; and, a search service, the search service directing during execution of the data driven application in the application server a search engine query of the selection of the different fields in the single search index and not the different data sources according to the at least one query term provided in the search user interface without first requiring a join operation joining the different data sources.

8. The system of claim 7, wherein the data driven application is a user interface workflow.

9. The system of claim 7, wherein at least one of the different data sources is separate and independent of the data driven application.

10. The system of claim 7, wherein at least one of the different data sources is accessible through an intermediate business object.

11. The system of claim 7, further comprising a form service executing in the application server, the form service updating data in the different fields of the single search index responsive to a data access operation directed in the form during the execution of the data driven application.

12. The system of claim 11, wherein the form service updates corresponding data fields in the data sources subsequent to updating the single search index responsive to a data access operation directed in the form during the execution of the data driven application.

13. A computer program product for multi-source searching for a data driven application, the computer program product comprising:

a computer readable storage medium having computer readable program code embodied therewith, the computer readable program code comprising:

computer readable program code for defining a form for a data driven application, the form comprising a plurality of user interface controls corresponding to respectively to different fields in different data sources;

computer readable program code for generating a single search index for the form, the single search index including the different fields referenced in the form and also at least one data operation for the different fields referenced in the form;

computer readable program code for coupling the form with a search user interface comprising a search control configured to accept at least one query term, the search control comprising a text control configured to link to one or more of the different fields of the single search index; and, computer readable program code for directing during execution of the data driven application a search engine query of the selection of the different fields in the single search index and not the different data sources according to the at least one query term provided in the search user interface without first requiring a join operation joining the different data sources.

14. The computer program product of claim 13, wherein the data driven application is a user interface workflow.

15. The computer program product of claim 13, wherein at least one of the different data sources is separate and independent of the data driven application.

16. The computer program product of claim 13, wherein at least one of the different data sources is accessible through an intermediate business object.

17. The computer program product of claim 13, further comprising computer readable program code for updating data in the different fields of the single search index responsive to a data access operation directed in the form during the execution of the data driven application.

18. The computer program product of claim 17, further comprising computer readable program code for updating corresponding data fields in the data sources subsequent to updating the single search index responsive to a data access operation directed in the form during the execution of the data driven application.

19. A searching method for a data driven application, the method comprising:

defining a search form for a data driven application, the search form comprising a plurality of search user interface controls, each of the search user interface controls comprising a text control and corresponding to at least one different field in a single search index of data sourced from at least one data source, the single search index also including at least one data operation for at least one field of the search form, at least one of the search user interface controls specified to correspond to a selection of different fields of the single search index;

accepting different search terms in different ones of the search user interface controls; and, directing a search engine query of a selection of specified different fields in the single search index and not the different data sources according to the search terms without first requiring a join operation joining the different data sources.

* * * * *